United States Patent [19]

Wu

[11] Patent Number: 5,242,747
[45] Date of Patent: Sep. 7, 1993

[54] GAS PERMEABLE MATERIALS

[75] Inventor: Huey S. Wu, Newark, Del.

[73] Assignee: W. L. Gore & Associates, Inc., Newark, Del.

[21] Appl. No.: 990,224

[22] Filed: Dec. 14, 1992

[51] Int. Cl.⁵ .............................................. B32B 7/00
[52] U.S. Cl. .................................... 428/254; 55/527;
428/253; 428/255; 428/260; 428/262; 428/289;
428/290; 428/304.4; 428/421; 428/422;
428/514
[58] Field of Search ............... 428/253, 254, 255, 260,
428/262, 289, 290, 304.4, 422, 514, 426; 55/527

[56] References Cited

U.S. PATENT DOCUMENTS 4,014,857  3/1977  Schmoyer .................... 260/67.6 R Primary Examiner—James J. Bell
Attorney, Agent, or Firm—Gary A. Samuels

[57] ABSTRACT

A gas permeable material having continuous pores through it, in which the pore interiors are coated with the reaction product of a) an ester of a perfluoroalkyl alcohol and a poly-basic hydroxyl-containing carboxylic acid, and b) a melamine formaldehyde, urea-formaldehyde, or glycol modified formaldehyde. The material is oleophobic and is useful in filtration applications and in garments.

7 Claims, No Drawings

GAS PERMEABLE MATERIALS

FIELD OF THE INVENTION

This invention relates to gas permeable materials that are hydrophobic and oleophobic. More particularly, the invention relates to materials coated with a composition that is hydrophobic and oleophobic for use in filtration and in garment constructions.

BACKGROUND OF THE INVENTION

There is a need for gas permeable materials having enhanced oleophobic and hydrophobic properties.

Gas filters and vent filters have been made from porous materials including porous polymers, such as porous polyolefins or polytetrafluoroethylene. However, the oleophobicity and hydrophobicity of such materials needs to be enhanced. For example, lack of oleophobicity has impaired use of such materials as gas filters in uses involving engines or devices that are commonly exposed to oil in the surrounding environment.

Moreover, thin flexible laminates containing porous films or membranes are useful in garment constructions, and oil and water repellancy is sometimes desirable.

SUMMARY OF THE INVENTION

The product of this invention is a flexible gas permeable material which comprises a substrate which has passageways, or continuous pores, through the substrate, and a coating on at least a portion of the interior of the passageways which is the reaction product of:

A. an ester of a perfluoroalkyl alcohol of 4-24 carbon atoms and a poly-basic hydroxyl-containing carboxylic acid of 2-6 carbon atoms, and B. a resin material selected from the class consisting of melamine formaldehyde resin, urea-formaldehyde resin, and glycol modified formaldehyde resin.

The process of the invention comprises coating a gas permeable material which has passageways through the material with a mixture of A and B described above, and crosslinking the mixture.

By continuous pores or passageways is meant that the material has interstices that comprise continuous interconnecting passageways extending through the thickness of the material so that the passageways open on both sides.

The coating coats a portion of the surface of the pores but does not block the pores. Thus, the gas permeability property of the gas permeable material remains intact and the material is useful as a filter to pass gas therethrough. The presence of the coating renders the material more oleophobic than the material without the coating.

DESCRIPTION OF THE INVENTION

The gas permeable material can be any material that allows passage of gas, especially air. It is a material that contains interstices that comprise continuous passages extending through the thickness of the material. The passageways open on both sides. Preferably the material is flexible and is in sheet, tube, or plug form. The material can be a fabric, such as a nonwoven, woven, or knit fabric, or a scrim. The material can be made of paper such as filter paper, or a cloth. The material can also be a porous polymeric film or membrane, synthetic or natural, where the pores form the interstices or passageways. Representative polymers useful in the material include polyamide, polyurethane, polyester, polyvinylidene fluoride, polyacrylic, polyolefins such as polyethylene and polypropylene, and the like. The material will generally be from about 1 to about 200 micrometers thick.

Preferred as a gas permeable filter material is porous polytetrafluoroethylene (PTFE), especially microporous expanded polytetrafluoroethylene membrane sheet made as described in U.S. Pat. No. 3,953,566 which has a microstructure of nodes interconnected with fibrils. The resulting micropores or voids allow for good gas or air flow while providing liquid water resistance. These porous PTFE membranes preferably have a Gurley number of between 0.1 second and 80 seconds, depending on pore size and pore volume.

The esterification products are the reaction products of a perfluorinated alcohol and a polybasic carboxylic acid having hydroxyl functionality. The perfluorinated alcohols useful to make o the esterification product in the coating material are of the general formula $$R_f(CH_2)_nOH$$

wherein $R_f$ is perfluoroalkyl, linear or branched, of between 4 and 24 carbon atoms, and n is an integer from 1 to 12. Representative Rf groups include 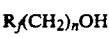, $C_{24}F_{49}$—, and the like. A preferred alcohol is a mixture of $F(CF_2)_n(CH_2)_2OH$ where n is 6, 8, 10, 12 and 14. Polybasic acids includes di- and tri-basic alkyl carboxylic acids. For example, one such acid is citric acid, which has the formula

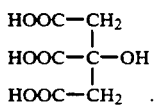

The complete esterification of citric acid is difficult to obtain because stearic hindrance inhibits esterification of the middle COOH group to aid in esterifying the hindered —COOH group, an epoxide is sometimes added to the reaction mix. An especially preferred polybasic acid is malic acid, which has the formula

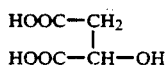

or tartaric acid, which has the formula

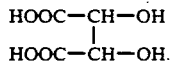

The alcohol or the ester is then reacted with a crosslinking agent such as a melamine formaldehyde resin, or a urea-formaldehyde, or a glycol modified formaldehyde resins.

Melamine is an acrylic amine of the formula $C_3H_6N_6$, i.e.,

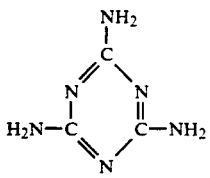

The melamine formaldehyde resins are the reaction products of melamine and formaldehyde (HCHO). They can contain several methylol groups per molecule, since the methylol content depends on the melamine/formaldehyde ratio and on the reaction conditions. The simplest reaction product is trimethylolmelamine

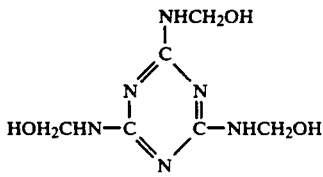

The coating mixture is prepared by simply mixing the esterification product with the crosslinking material in a suitable solvent, such as a ketone, such as acetone, or an alkyl alcohol, such as 2-propanol, or water-based emulsion of the material. The concentration of materials in the solvent will depend on the loadings desired.

The coating solution is applied by any convenient means to the porous filter material and spread uniformly over the material. Dip coating or spraying can be used so as to coat the pore walls but not block them. The solvent is then evaporated by any convenient means, and then heat curing is carried out to form the necessary crosslinked material.

The materials used to form the gas permeable substrates and used to form the coating may contain various other additive ingredients to impart specific properties to the product or as a process aid. For example, they may include ultraviolet light stabilizers, bacteriostats, and the like.

The coating imparts increased hydrophobic and oleophobic properties to the coated product, and the resulting coated materials exhibit unusually good hydrophobic and oleophobic properties while having good gas or air flow through the material. The resulting coated material can be used in applications involving gas flow where the material should be resistant to penetration by water, oil, or lipid emulsions. Such applications include use in waterproof, breathable fabrics, and gas vents or filters that protect electronic equipment used in or near automotive engines and the like. Useful applications also include medical devices where venting filters are needed, and in industrial filtration, where venting filters are needed, where oil mists are present.

The coated materials are also useful in medical vents where oil or fatty substances in parental drip bottles can clog gas vents.

EXAMPLES

Example 1

Two coated products (A and B) were prepared as follows:

(A) 3g of perfluoroalkylcitrate (Zonyl TBC) obtained from the DuPont Company was mixed with 0.6 g melamine formaldehyde resin (Aerotex 3030, American Cyanamid), 0.15 g catalyst (Aerotex DC, American Cyanamid), and 60 g Freon-TF (DuPont) and 5g 2-propanol. An expanded porous PTFE membrane (ePTFE) was dipped into the mixture. The coated membrane was air dried, then placed in an oven at 170° C. for 2 minutes to complete the curing step.

(B) Perfluoroalkylcitrate (Zonyl TBC) was mixed with perfluoroalkyl epoxide (Zonyl TE, DuPont) (wt. ratio 3:1) at 100° C. for 4 hours. Then 3 g of that product without any purification were mixed with 0.6 g melamine formaldehyde resin (Aerotex 3730, American Cyanamid), 0.15 g catalyst (Aerotex DC, American Cyanamid), and 60 g Freon-TF (DuPont) and 5g 2-propanol. The coating and curing steps were carried out the same way as in part (A).

The membrane used was obtained from W. L. Gore & Associates, Inc. and was about 20 cm by 20 cm and about 0.005 cm thick.

Test Results

Oil Rating

In these tests, oil rating was carried out by AATCC Test Method 118-1983. The higher the number, the better the oil repellency.

The tests for gasoline, engine cleaner, motor oil, methanol, acetone and transmission fluid were carried out by the same procedure as the oil rating test, but using the fluid specified. The test temperature was as indicated. The time a drop of fluid was on the coated material was five minutes, after which the "repel" or "wet" condition was observed and recorded. By "repel" is meant that the drop did not noticeably spread.

|  | Temperature | Uncoated ePTFE | Example (A) | Example (B) |
| --- | --- | --- | --- | --- |
| Oil Rating |  | 1 | 8 | 8 |
| Gasoline (Mobil, Reg. unleaded) | 25° C. | wet | repel | repel |
| Engine Cleaner (prestone) | 70° C. | wet | wet | repel |
| Motor Oil (Quaker) | 25° C. | wet | repel | repel |
| Methanol | 25° C. | wet | repel | repel |
| Acetone | 25° C. | wet | wet | repel |
| Transmission Fluid (CASTROL, Type F) | 70° C. | wet | repel | repel |

Gurley Numbers were obtained as follows:

The resistance of samples to air flow was measured by a Gurley densometer (ASTM D726-58) manufactured by W. & L. E. Gurley & Sons. The results are reported in terms of Gurley number which is the time in seconds for 100 cubic centimeters of air to pass through 1 square inch of a test sample at a pressure drop of 4.88 inches of water.

The Water Entry Pressure (WEP) was measured following the Quality Control Test Method No. 584 of W. L. Gore & Associates, Inc. The WEP tester used is manufactured by Gore. Test sample is clamped between a pair of testing plates taking care not to cause damage. The lower plate has the ability to pressurize a section of the sample with water. A piece of pH paper is placed on top of the sample between the plate on the non-pressurized side as an indicator of evidence for water entry. The sample is then pressurized in small increments, waiting 10 seconds after each pressure change until a color change in the pH paper indicates the first signs of water entry. The water pressure at breakthrough or entry is recorded as the Water Entry Pressure. The le$t results are taken from the center of test sample to avoid erroneous results that may occur from damaged edges.

Water entry pressure below 2 psi was measured with an apparatus based upon the above WEP tester with modifications for low pressure. A sample with pH paper is held in a 25 mm clear filter holder obtained from Nuclepore Corporation, such that one side of the membrane can be pressurized with water. Water column is applied to the sample in gradual increments until a color change appears in the pH paper. The height of the water column is recorded and converted to psi.

Results were:

|  | Uncoated ePTFE | Example (A) | Example (B) |
|---|---|---|---|
| Gurley (seconds) | 8 | 14 | 14 |
| Water Entry Pressure | >10 psi | >10 psi | >10 psi |

EXAMPLE 2

(A) Perfluoroalkylalcohol (Zonyl BA-N) was reacted with DL malic acid (Aldrich) at a mole ratio 1.2:1.0 at 180° for 8 hours using toluene sulfonic acid (0.5% wt based on Zonyl BA-N) as catalyst. 1 g of the reaction product was dissolved in 20 g FreonTF and acetone (1:1 wt ratio) that contained 0.2 g melamine formaldehyde resin (Aerotex 3030) and 0.01 g Aerotex 4040 (catalyst), at ordinary room conditions. An expanded porous polytetrafluoroethylene membrane was dipped in the solution, air dried, and oven cured at 170° C. for 2 minutes. The coated membrane was ready for testing. A piece of nylon taslite fabric was also dipped in the solution, air dried, and oven cured at 170° for 2 minutes. This fabric was ready for testing.

(B) Perfluoroalkyl alcohol (Zonyl BA-N) was reacted with DL tartaric acid (Aldrich) at a mole ratio of 1.2:1.0, under the same condition as in Example 2A, and then 1 g of the reaction product was dissolved in 20 g Freon TF and acetone (1:1 wt ratio) that contained 0.2 g melamine formaldehyde resin (Aerotex 3030) and 0.01 g Aerotex 4040 (catalyst), at ordinary room conditions. A piece of ePTFE membrane and a piece of nylon taslite fabric were each coated in the solution the same way as in Example 2A. The membrane and the fabric were ready for testing.

Test Results

|  | 2A | | 2B | |
|---|---|---|---|---|
|  | coated membrane | coated fabric | coated membrane | coated fabric |
| oil rating | 8 | 8 | 8 | 8 |
| Gurley (secs) | 12 | — | 13 | — |

— means "not measured"

Each test was carried out as in Example 1.

I claim:

1. A flexible gas permeable material which comprises a substrate that contains passageways through the substrate, and a coating on at least a portion of the interior of the passageways, which is the reaction product of
   a) an ester of a perfluoroalkyl alcohol of 4–24 carbon atoms and a poly-basic hydroxyl-containing carboxylic acid of 2–6 carbon atoms and
   b) a resin selected from the class consisting of melamine formaldehyde resin, urea-formaldehyde resin, and glycol modified formaldehyde resin.

2. The gas permeable material of claim 1 wherein the material is a sheet selected from the class consisting of woven fabric, nonwoven fabric, knit fabric, porous polymeric sheets, cellulosic papers, and fiberglass papers.

3. The gas permeable material of claim 2 wherein the material is expanded porous polytetrafluoroethylene (PTFE).

4. The gas permeable material of claim 1 or 3 wherein component b) of the reaction product is ) melamine formaldehyde resin.

5. The gas permeable material of claim 1 or 3 wherein in the reaction product, the ester is an ester of a perfluoroalkyl alcohol of 4–24 carbon atoms and a polybasic hydroxyl-containing carboxylic acid selected from the class consisting of malic acid and tartaric acid, and the resin is selected from the class consisting of melamine formaldehyde resin and urea formaldehyde resin.

6. The gas permeable material of claim 1 or 3 wherein in the reaction product, the ester is an ester of citric acid and of both a perfluoroalkyl alcohol and a perfluoroalkyl epoxide.

7. Process comprising placing the material defined in claim 1 in a filter holder and subjecting the combination so obtained to a stream of gas.

* * * * *